Patented Apr. 28, 1936

2,039,008

UNITED STATES PATENT OFFICE 2,039,008

METHOD OF MAKING A MATERIAL FOR ABSORBING SOUND

Max H. Kliefoth, Madison, Wis., assignor to C. F. Burgess Laboratories, Inc., Madison, Wis., a corporation of Delaware No Drawing. Application July 28, 1932, Serial No. 625,559

1 Claim. (Cl. 181—33)

This invention relates to an improved absorber for gaseous pressure waves such as sound waves and gas engine exhausts. The invention herein disclosed is designed for use especially in constructions where the absorber is subject to excessive vibration and gas impact, such as in exhaust mufflers of gas engines, although it may be used in other situations. It is particularly an improvement over the loose-packed materials of a mineral of ceramic nature disclosed in the Schnell Patent No. 1,811,762.

It is an object of this invention to provide a sound absorbing and gas-pressure wave absorbing material that is cheap to make, is easy to handle, may be made light in weight and does not abrade appreciably when it is used in mufflers for the exhaust gases of automobile engines.

The impact of the slugs of exhaust gas of an internal combustion engine passing through the duct of the Schnell Patent No. 1,811,762, or passing through the absorber itself, causes an appreciable movement of the particles of loose-packed absorber unless these particles are bound together into a unit by an adhesive. This violent movement causes abrasion between adjacent particles, especially if they are of a non-metallic or ceramic nature and if they do not have hard, smooth and wear-resisting surfaces. The abrasive action is aggravated in an automobile by the vibration of the engine and car, especially when it is moving at high speeds. This vibration is not only transmitted to the muffler but it also extends to the intake silencer.

Although it is possible to use an adhesive to form a unitary structure of the absorbing material, this increases the cost, causes additional assembling difficulties and unless it is used carefully it may fill some of the interstices between the particles forming the structure and thereby decrease its absorbing qualities. It is advantageous to use a loose-packed material of a non-metallic nature because of its low cost and heat-resisting qualities, provided the high abrasion losses can be overcome. Such abrasion losses usually are high if the material is light and porous because the surface usually is also of a porousous nature or has a matte structure. It, therefore, abrades readily when it rubs against a similar adjacent particle.

I have found that it is possible to reduce sufficiently the abrasion losses of matte-surfaced, non-metallic or ceramic materials so that these materials may become desirable absorbers. This is accomplished by making a matte-surfaced particle or bead which preferably has rounded surfaces, and surfacing such a rounded particle or bead with an unctuous material such as soapstone or graphite, especially the latter. If the bead is free of sharp projections, roughness, sharp corners and the like, that is, if it is rounded, the tendency to abrade is reduced greatly. The unctuous surface acts as a lubricant during the relative movement of the adjacent particles and eliminates, for all practical purposes, the abrasion losses, provided, of course that the surface of the bead before coating is reasonably hard.

Such beads or nodules may be made of a variety of materials of a ceramic nature and may vary from solid, burned clay beads to hollow spheres and tube-like beads made of special ceramic compositions. Such beads or nodules also may be porous throughout. The solid burned clay beads are too heavy for most purposes, and especially for use in automobile mufflers. I prefer hollow beads made by puffing a mixture of an alkali silicate, such as sodium silicate, and a filler, such as clay. The beads are then hardened by heating them at a low red heat. These may be made to weigh less than twenty pounds per cubic foot, though a product weighing less than forty pounds per cubic foot usually is acceptable. I have made such hollow beads weighing as low as ten pounds per cubic foot. The type of service determines the exact composition of the beads.

The beads need not be spheres but may be of any modified spheroid shape provided they do not have sharp corners or protuberances, that is, provided they are rounded. They may be in the shape of hollow tube-like beads with rounded ends. The surfaces may be porous and the interior may be a honey-comb structure, which structure is included in the term "hollow".

The preferred hollow beads of my invention may be made by the following method, this specific example merely being illustrative of the invention. One part by weight of fine fire clay is mixed with one part by weight of 42° Bé. silicate of soda having an $SiO_2$ to $Na_2O$ ratio of 3.25 to 1. A doughy mass results which is extruded into short small cylinders depending upon the size of bead desired. For the production of finished beads of an average diameter of about $\frac{3}{16}$ inch, extruded cylinders $\frac{3}{32}$ inch in diameter and about $\frac{1}{8}$ inch long (before puffing) are suitable. These putty-like cylinders are then rolled in talc to round off any sharp edges and to cover them with a material which prevents sticking. They are then heated in a rotating drum to cause the silicate of soda to puff and to form a hollow or porous, rounded bead from each cylinder. After the puffing operation is complete the temperature is raised to about a low red heat to harden the surface and make the product water resistant.

The resulting hollow, matte-surfaced or porous, surfaced beads are then tumbled in an unctuous material, such as finely ground exfoliated vermiculite, mica, soapstone or graphite, the latter being preferred. It is desirable to use a very finely ground, highly unctuous grade of graphite for the best results. The beads acquire an unctuous and polished surface and are then ready to be used. The presence of steam during the coating operation seems desirable. The surface of the beads also may be wet with a slight amount of water or oil prior to the coating operation to facilitate this operation.

For sound absorbing structures, and also for mufflers, the average diameter of the beads should neither be too small nor too large or the absorbing efficiency decreases. It usually is desirable to have their average finished diameter less than about ½ inch and usually greater than about $\frac{1}{32}$ inch. For mufflers, silencers and other sound absorbing constructions, I have found that finished beads having an average diameter of between about ¼ inch and about $\frac{3}{8}$ inch are most desirable. These sizes are approximated by screening the beads and using those passing through a four mesh screen and staying on an eight mesh screen.

Graphite has been found to be suitable unctuous surfacing material for beads used in gas engine mufflers. Its oxidizing temperature is sufficiently high for this purpose.

The facing or retaining member for the loose-packed beads is preferably a perforated stiff membrane such as is described in the Schnell patent.

Although in the specific example given, equal parts of sodium silicate and fire clay are used, the proportion of these ingredients varies with the type of clay and alkali silicate used. For example, if a certain type of bentonite is the clay used only about 1 part is required with 3 parts of the sodium silicate previously described. However, the beads made from this mixture have a much smoother and harder surface probably because of the greater silicate content. As a result the graphite does not adhere nearly as well as when the bead has a matte surface.

Although clays such as fire clay, shale and bentonite may be used with an alkali silicate as a puffing agent and are preferred for the production of hollow beads, other finely divided fillers such as kieselguhr and pumicite may be used. Materials such as limestone, dolomite, ashes, phosphate-rock, pumice, slag, etc., after fine grinding, also are suitable fillers. Bloated clay beads may be used. For the solid beads any material may be used which may be baked, or otherwise hardened into the desired form, with or without a binder, to produce a matte surface to which the unctuous material adheres. By tumbling a bead having a smooth and hard or glassy surface in sharp sand, it is possible to change the smooth surface into a matte surface. The unctuous material adheres to the matte surface so produced.

In the puffing operation previously described solid cylinders of a dough-like mixture of a filler and a puffing agent are used. Hollow cylinders such as short tubes may be substituted for the solid cylinders. The rounded beads which result from the puffing of the hollow cylinders in a rotating drum have a tendency to be more open in the center and may be more desirable for some purposes.

Although cylinders of a dough-like material for the puffing operation are described, the unpuffed material may be molded into any convenient shape or cross section. The shape may be square or hexagonal or the dough-like material may be shaped into lozenges or spherical pills.

The beads may also be in the form of short-length tubes of various shapes as described more fully in my copending application Serial No. 625,558, filed July 28, 1932. Such tubes are made preferably of a ceramic mixture comprising clay which may be indurated with a caustic alkali, or an alkali silicate, or both. They may be made of clay fired at a high temperature. The weight of the material may be decreased by incorporating kieselghur into the clay. They may be made by extruding any plastic clay into tubes in the usual way, cutting the tubes to length and firing or hardening them in a kiln. The unctuous material is then applied as described. Such finished tubes also may vary over a considerable range of sizes but in general it is desirable to keep them less than ½ inch both in length and diameter. Excellent results are obtained with tubes having an outside diameter of not more than approximately ⅛ inch, a wall thickness of approximately 0.015 inch and a length of about $\frac{1}{16}$ inch to ⅜ inch. Such tubes may be made to weigh less than 20 pounds per cubic foot. The lower limit of size is governed by the size of the openings of the foraminous facing used. The plastic tubes are tumbled as previously described to round the ends and sharp edges to decrease the abrasion losses when used. Tubes made of a sufficiently hard material and free from surface roughness need only a short tumbling operation, that is, the edges of the cylinders need not be rounded an appreciable amount.

The term "bead" is used in the generic sense and includes a wide variety of more or less spherical or tube-like hollow or porous, or solid formed particles, as described previously.

The absorber of this application also may be used in constructions where absorption of the gaseous pressure-wave is effected in part or in whole by passing the pressure-wave through it instead of along a surface of it.

I claim:

The method of making a material for absorbing sound, gas pressure waves and the like which comprises making rounded beads with matte surfaces, and tumbling said beads in unctuous graphite in the presence of steam until they acquire an appreciable coating thereof.

MAX H. KLIEFOTH.